United States Patent [19]

Okuda et al.

[11] Patent Number: 4,829,108

[45] Date of Patent: May 9, 1989

[54] SOLID COATING COMPOSITIONS

[75] Inventors: Yasuji Okuda, Hirakata; Shizuo Maruyama, Katano; Hiromasa Sugimoto, Nara, all of Japan

[73] Assignee: Sakura Color Products Corporation, Osaka, Japan

[21] Appl. No.: 144,127

[22] Filed: Jan. 15, 1988

[30] Foreign Application Priority Data

Mar. 31, 1987 [JP] Japan .................................. 62-80637

[51] Int. Cl.$^4$ ........................... C08K 5/05; C08K 5/09
[52] U.S. Cl. ........................................ 524/37; 524/41; 524/46; 524/58; 524/108; 524/109; 524/503; 524/512
[58] Field of Search ................. 524/108, 109, 58, 503, 524/512, 37, 41, 46

[56] References Cited

U.S. PATENT DOCUMENTS 4,212,786 7/1980 Murakami .

FOREIGN PATENT DOCUMENTS 54-23619 8/1979 Japan .
55-41716 10/1980 Japan .
60-81257 5/1985 Japan .
61-31474 2/1986 Japan .

OTHER PUBLICATIONS

Derwent Abstract 83-805456/44 Pentel KK J58162674 (9-83).
Derwent Abstract 84-149653/24 Yokohama J59078958 (5-84).

Primary Examiner—Herbert J. Lilling
Attorney, Agent, or Firm—Larson and Taylor

[57] ABSTRACT

This invention provides a solid coating composition comprising:
(A) at least one of a vinyl resin resin and a cellulose resin;
(B) at least one of a ketone resin and a xylene resin;
(C) an acrylic resin comprising about 40 to about 90% by weight of methyl methacrylate, about 10 to about 60% by weight of at least one of acrylic acid, an acrylic acid derivative, methacrylic acid and a methacrylic acid derivative other than methyl methacrylate, and up to about 10% by weight of a copolymerizable monomer;
(D) at least one of benzylidene sorbitol, dibenzylidene sorbitol, tribenzylidene sorbitol and a derivative thereof;
(E) at least one of an ether of a glycol, ether ester of a glycol and a benzoic acid ester; and
(F) a pigment.

The solid coating composition is easy to handle and easy to apply, gives coating film of excellent film properties, and has other excellent advantages.

23 Claims, No Drawings

SOLID COATING COMPOSITIONS

This invention relates to solid coating compositions, and more particularly, to solid coating compositions which are capable of forming a coating film having excellent film properties comparable to those of liquid coating compositions and which are easy to handle and apply evenly for ordinary people.

Heretofore known techniques relating to solid coating compositions or compositions similar to such solid coating compositions are high-solid type solid paint disclosed in Japanese Unexamined Patent Publication (Kokai) No. 60-81257, a process for preparing a solid paint using undispersed pigment disclosed in Japanese Unexamined Patent Publication (Kokai) No. 61-31474, a process for preparing a crayon disclosed in Japanese Patent No. 988800, and crayon disclosed in Japanese Patent No. 1051051.

However, these prior art techniques have various drawbacks. For example, the high-solid type solid paint disclosed in Kokai No. 60-81257 has disadvantages of being difficult to apply and giving uneven coating film due to its high solids content, and of being difficult to produce due to the necessity of adjusting the solids content to as high as at least 75% by weight by removing the solvent of a conventional liquid coating composition under reduced pressure or by other method which renders the production process complicated.

The solid paint prepared by the technique of Kokai No. 61-31474 has disadvantages of failing to give smooth and glossy coating film because in that technique an undispersed pigment is used as it is and is not dispersed by sand mill or roll mill.

The crayons which is similar to solid coating compositions have disadvantages of giving coating film which are poor in adhesion and which, when used outdoors, are easily affected by sunshine, rain and the like and markedly deteriorated in terms of water resistance and weather resistance, hence impossible to use them for coating purposes. Furthermore, when an air drying coating composition is applied as topcoat to the coating film of the crayons, the wet coating of the air drying coating composition will not dry or will only dry after a considerably long period of time, or even if it can dry, delamination occurs.

An object of the invention is to provide a solid coating composition which can obviate the foregoing drawbacks of the prior art techniques.

Another object of the invention is to provide a solid coating composition which will not drip and does not require coating devices such as brush or diluents such as thinner and therefore is easy to handle and apply, and which is capable of giving coating film having film properties (such as water resistance, adhesion and weather resistance) which are comparable or superior to those of the coatings of conventional liquid coating compositions.

Another object of the invention is to provide a solid coating composition which can give coating film over which a wet coating of an air drying coating composition applied as topcoat can effectively dry.

The above objects and other features of the invention will become apparent from the following description.

This invention provides a solid coating composition comprising:

(A) at least one of a vinyl resin and a cellulose resin wherein the vinyl resin is selected from the group consisting of polyvinyl butyral, polyvinyl acetate, vinyl acetate-vinyl chloride copolymer and vinyl acetateethylene copolymer and wherein the cellulose resin is selected from the group consisting of cellulose acetate butyrate, ethyl cellulose and acetyl cellulose;

(B) at least one of a ketone resin and a xylene resin;

(C) an acrylic resin comprising about 40 to about 90% by weight of methyl methacrylate, about 10 to about 60% by weight of at least one member selected from the group consisting of acrylic acid, an acrylic acid derivative, methacrylic acid and a methacrylic acid derivative other than methyl methacrylate, and up to about 10% by weight of a copolymerizable monomer;

(D) at least one gelling agent selected from the group consisting of benzylidene sorbitol, dibenzylidene sorbitol, tribenzylidene sorbitol and a derivative thereof;

(E) at least one organic solvent selected from the group consisting of an ether of a glycol, an ether ester of a glycol and a benzoic acid ester; and (F) a pigment.

We have conducted extensive research on solid coating compositions, and found that the foregoing objects of the invention can be accomplished by using the above components (A) through (F) in combination. That is to say, the solid coating composition of this invention containing the above components is excellent in application workability because it has a solids content comparable to that of conventional liquid coating compositions; and is capable of giving a finished coating film of excellent appearance; does not necessitate adjusting the solids content of a liquid coating composition by evaporation under reduced pressure unlike the prior art solid paint; is capable of giving a coating film with excellent properties (water resistance, adhesion, weather resistance, etc.) which are by far superior to those of the prior art solid paints; and does not retard the drying of wet coating film of an air drying coating compositions such as alkyd resin coating composition or cashew resin coating composition which is applied as topcoat onto the coating film of the solid coating composition of the invention, unlike the prior art crayons disclosed in Japanese Patents No. 988800 and No. 1051051.

In addition, the solid coating composition of the invention has the advantages of giving smooth and glossy film because the pigment is uniformly dispersed; giving a film which has good adhesion to surfaces of metals, glass, plastics, wood and the like; being easy to produce; being easy to carry; having an appropriate hardness (penetration value at 25° C. is about 50 to 120 as determined according to ASTM D-1321) so that it can be easily applied to the surfaces of various articles without need of any coating devices such as brush and the like.

It is essential in the present invention to use the foregoing components (A) through (F). Particularly important is the use of component (C), i.e., an acrylic resin comprising the specific monomers in the specified proportions. That is to say, when component (C) is not used or when an acrylic resin other than the above specific acrylic resin (i.e., component (C)) is used, the foregoing excellent effects (especially, excellent film properties such as resistances to water, weather and corrosion, and drying of topcoat) of the invention will not be produced.

Component (A) useful in the invention includes cellulose resins and vinyl resins. Examples of suitable cellulose resins are cellulose acetate butyrate, ethyl cellulose, acetyl cellulose and the like. Examples of suitable vinyl resins are polyvinyl butyral, polyvinyl acetate, vinyl acetate-vinyl chloride copolymer, vinyl acetate-ethylene copolymer and the like. Preferable cellulose resins are cellulose acetate butyrate containing about 10 to about 15% by weight of acetyl and about 30 to about 45% by weight of butyryl; ethyl cellulose containing about 40 to about 55% by weight of ethoxy; and acetyl cellulose containing about 45 to about 65% by weight of acetyl. Preferable vinyl resins are polyvinyl butyral containing up to about 5% by weight of vinyl acetate, about 18 to about 27% by weight of vinyl alcohol and at least about 69% by weight of vinyl butyral and having a polymerization degree of about 300 to about 2,000; polyvinyl acetate having a polymerization degree of about 200 to about 500; vinyl acetate-vinyl chloride copolymer having a molecular weight of about 13,000 to about 18,000 and containing about 10 to about 20% by weight of vinyl acetate; and vinyl acetate-ethylene copolymer having a softening point of about 80° to about 95° C. and containing about 45 to about 80% by weight of vinyl acetate.

Among the foregoing members of component (A), polyvinyl butyral containing up to about 5% by weight of vinyl acetate, about 18 to about 27% by weight of vinyl alcohol and at least about 69% by weight of vinyl butyral and having a polymerization degree of about 300 to about 2,000 is particularly preferred.

Component (A) functions as a binder for dispersing pigment when component (F), i.e., a pigment is dispersed first in component (A), followed by addition of other components in preparing the solid coating composition of the invention with the result that the pigment (component (F)) is uniformly dispersed as fine particles in the solid coating composition. Component (A) also imparts suitable hardness to the solid coating composition of the invention.

With respect to component (B), examples of suitable xylene resins are a condensation product of mxylene and formalin which condensation product is modified with a $C_1$-$C_6$ alkyl-substituted phenol (about 1200 to about 1300 in molecular weight) and the like. Examples of suitable ketone resin are a condensation product of cyclohexanone and formaldehyde (about 80° to about 120° C. in softening point, and substantially zero in acid value) and the like. Component (B) imparts improved adhesion to surfaces of metals, glass, plastics, wood and the like to the resulting solid coating composition of the invention.

Component (C), i.e., an acrylic resin comprising about 40 to about 90% by weight of methyl methacrylate, about 10 to about 60% by weight of at least one member selected from the group conisting of acrylic acid, an acrylic acid derivative, methacrylic acid and a methacrylic acid derivative other than methyl methacrylate, and up to about 10% by weight of a copolymerizable monomer gives improved water resistance and weather resistance and the like to the coating film of the solid coating composition of the invention and also plays a role of accelerating the drying of wet coating of an air drying coating composition applied as topcoat to the dry film of the solid coating composition of the invention. As to the monomers constituting the acrylic resin (component (C)), examples of acrylic acid derivatives are $C_1$-$C_8$ alkyl esters of acrylic acid; in particular, ethyl acrylate and butyl acrylate are preferred and methyl acrylate, 2-ethylhexyl acrylate and propyl acrylate are also usable and additionally 2-hydroxyethyl acrylate and the like are also usable. Examples of methacrylic acid derivatives are methacylates other than methyl methacrylate, including $C_2$-$C_4$ alkyl esters of methacrylic acid such as ethyl methacrylate, propyl methacrylate and butyl methacrylate, as well as 2-hydroxyethyl methacrylate and the like. Examples of copolymerizable monomers are styrene, itaconic acid, dimethyl fumarate and the like.

Among the above acrylic resins, preferable are those comprising about 50 to about 80% by weight of methyl methacrylate, about 15 to about 50% by weight of at least one member selected from the group conisting of acrylic acid, an acrylic acid derivative, methacrylic acid and a methacrylic acid derivative other than methyl methacrylate, and up to about 5% by weight of a copolymerizable monomer.

Although there is no specific restriction on the method of copolymerizing these monomers, it is preferable to use acrylic resin prepared by copolymerizing these monomers by solution polymerization in a conventional manner. In such solution polymerization, it is preferable to use as the solvent therefor a solvent which falls within the scope of component (E). It is also preferable to use azobisisobutyronitrile, benzoyl peroxide and the like as the initiator therefor. A chain transfer agent such as n-dodecyl mercaptan may be used for adjusting the molecular weight of the resulting acrylic resin. The acrylic resin (component (C)) thus prepared preferably has a viscosity ranging from D to $Z_1$ in accordance with Gardner-Holdt method when determined in the form of a resin solution having a solids content of 50% by weight.

Component (D), i.e., benzylidene sorbitol, dibenzylidene sorbitol, tribenzylidene sorbitol and a derivative thereof include condensation products of xylitol, sorbitol or heptitol and an aromatic aldehyde of the formula

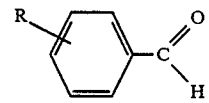

wherein R is a hydrogen atom, an alkyl group having 1-3 carbon atoms, or methoxy group. These condensates are all known to solidify organic solvents. Among these, condensation products of sorbitol and an aromatic aldehyde are preferred.

Examples of suitable benzylidene sorbitol derivatives are those in which the benzene nucleus of the benzylidene group of benzylidene sorbitol has a $C_1$-$C_3$ alkyl group at an optional position, such as p-methylbenzylidene sorbitol, m-ethylbenzylidene sorbitol, etc. Examples of suitable dibenzylidene sorbitol derivatives are those in which the benzene nucleus of each benzylidene group of dibenzylidene sorbitol has a $C_1$-$C_3$ alkyl group at an optional position, such as [di(p-methylbenzylidene)]sorbitol, [di(m-ethylbenzylidene)]-sorbitol, etc. Examples of suitable tribenzylidene sorbitol derivatives are those in which the benzene nucleus of each benzylidene group of tribenzylidene sorbitol has a $C_1$-$C_3$ alkyl group at an optional position, such as [tri(p-methylbenzylidene)]-sorbitol, [tri(m-ethylbenzylidene)]-sorbitol, etc. The members of component (D)

may be singly used or at least two of them are used in admixture.

With respect to component (E), examples of ethers of glycols are $C_1$–$C_4$ alkyl ethers of $C_1$–$C_6$ glycols, such as methyl ethers, ethyl ethers, propyl ethers, butyl ethers and the like of ethylene glycol, diethylene glycol, propylene glycol, hexylene glycol and the like. Examples of ether esters of glycols are $C_2$–$C_3$ fatty acid esters, such as acetates, propionates and the like, of the above gylcol ethers. Examples of benzoic acid esters are $C_2$–$C_4$ alkyl esters of benzoic acid, such as ethyl benzoate, butyl benzoate and the like. Component (E) improves the coating workability and production efficiency, and also serves to adjust the viscosity of the composition during gellation.

Component (F) of the invention includes a coloring pigment and anticorrosive pigment. As the coloring pigment, various pigments conventionally used in the art can be used without any restriction. Particularly preferable pigments include titanium dioxide, red oxide, carbon black, phthalocyanine blue, fast yellow, naphthol red, yellow iron oxide and the like. Useful anticorrosive pigments are also not particularly limited and include a wide variety of those conventionally used in the art. Particularly preferable anticorrosive pigments include zinc powder, zinc chromate, calcium plumbate, red lead oxide, zinc phosphate, aluminum phosphate, zinc molybdate and the like. When an anticorrosive pigment used has a coloring property as well, it is possible to omit the use of coloring pigment. When an anticorrosive pigment is used singly or conjointly with a coloring pigment, the resulting solid coating composition of the invention acts as an anticorrosive coating composition.

In the present invention, a plasticizer may be used as component (G), if so desired. Such plasticizer is used for decreasing the hardness of coating film, thereby giving a coating film of improved flexibility. Useful plasticizers are any of those conventionally used for coating compositions and include phthalates such as dibutyl phthalate, dioctyl phthalate, diethyl phthalate, butyl benzyl phthalate and the like, epoxy plasticizers such as 2-ethylhexyl epoxyhexahydrophthalate, 2-ethylhexyl sebacate, tricresyl phosphate and the like.

The foregoing components (A) through (F) (and component (G) if used) are preferably used in the following proportions.

Component (A) is preferably used in an amount of about 3 to about 15 parts by weight, more preferably about 5 to about 10 parts by weight, per 100 parts by weight of the solid coating composition. If less than 3 parts by weight of component (A) is used, gellation of the composition will become difficult, whereas with more than 15 parts by weight of component (A) used, the adhesion of the coating film to surfaces of metals will tend to be reduced.

Component (B) is preferably used in an amount of about 5 to about 15 parts by weight, more preferably about 7 to about 12 parts by weight, per 100 parts by weight of the solid coating composition. If less than 5 parts by weight of component (B) is used, adhesion of the coating film to surfaces of metals will become less sufficient, whereas if more than 15 parts by weight of component (B) is used, an air drying coating composition applied as topcoat onto the dry coating film of the solid coating composition of the invention will sometimes become slow to dry or difficult to dry.

Component (C) is preferably used in an amount of about 10 to about 25 parts by weight, more preferably about 14 to about 20 parts by weight, per 100 parts by weight of the solid coating composition. If less than 10 parts by weight of component (C) is used, water resistance and weather resistance of the film (in the case of solid anticorrosive coating composition, salt water resistance and salt spray resistance) will become less satisfactory, whereas with more than 25 parts by weight of component (C) used, string will sometimes be formed during coating application thereby rendering the coating application difficult.

Component (D) is preferably used in an amount of about 3 to about 12 parts by weight, more preferably about 5 to about 9 parts by weight, per 100 parts by weight of the solid coating composition. If less than 3 parts by weight of component (D) is used, solidification or gellation of the composition will become difficult, whereas with more than 12 parts by weight of component (D) used, the resulting solid coating composition will tend to become too hard, thereby rendering the coating operation less smooth.

Component (E) is preferably used in an amount of about 30 to about 60 parts by weight, more preferably about 38 to about 52 parts by weight, per 100 parts by weight of the solid coating composition. If the amount of component (E) is outside of the above range, the resulting coating composition will have unsatisfactory coating properties during coating operation.

Component (F) is preferably used in an amount of about 0.3 to about 35 parts by weight per 100 parts by weight of the solid coating composition. Specifically, if coloring pigment alone is used, the amount thereof is preferably about 2 to about 35 parts by weight, more preferably about 4 to about 30 parts by weight, per 100 parts by weight of the solid coating composition. If less than 2 parts by weight of coloring pigment is used, the resulting solid coating composition will have lower opacifying properties, whereas the use of more than 35 parts by weight of coloring pigment is unlikely to produce noticeably improved effect. When anticorrosive pigment is used alone, the amount thereof is preferably about 0.3 to about 35 parts by weight per 100 parts by weight of the solid coating composition. If less than 0.3 parts by weight of anticorrosive pigment is used, the desired anticorrosive effect will not be fully provided, whereas the use of more than 35 parts by weight of anticorrosive pigment is not likely to produce a noticeably improved effect. When coloring pigment is used in combination with anticorrosive pigment, the combined amount thereof is preferably about 2.3 to about 35 parts by weight per 100 parts by weight of the solid coating composition, since the minimum amounts of coloring pigment and anticorrosive pigment are preferably about 2 parts by weight and 0.3 parts by weight, respectively, as mentioned above, while the use of more than 35 parts by weight of the combination of these pigments is not likely to produce a noticeably improved effect.

Component (G), i.e., plasticizer, if used, is preferably used in an amount of about 2 to about 8 parts by weight per 100 parts by weight of the solid coating composition.

The solid coating composition of this invention can be prepared from the foregoing components by various methods. For example, the solid coating composition can be prepared in the following manner. First, component (A) is dissolved in a portion of an organic solvent, i.e., component (E) with stirring. Then, a pigment, i.e., component (F) is added thereto with stirring and fully dispersed therein with use of a roll mill, ball mill, sand mill or the like. To the dispersion are added component (C) and the remaining portion of the organic solvent, and if desired, plasticizer, and the mixture is stirred for dissolution. Thereafter, component (D) is added and uniformly mixed therewith with stirring. The mixture is heated to a temperature close to the boiling point of the solvent used so that the solvent will completely dissolve the component (D) and yet will not evaporate. In case a portion of the solvent evaporates, it is preferable to add the same solvent afterwards to compensate the loss. Then component (B) is added and dissolved therein with stirring. The resulting mixture in a liquid state is placed into a mold and solidified by cooling.

The solid coating composition of the invention thus prepared can be used or preserved as it is or as contained in a suitable closed case. Examples of suitable cases are those resembling the cases for putting up rouges or glue sticks such as those described in Japanese Examined Utility Model Publication No. 53259/1982, those comprising a tube of air-impermeable material, such as aluminum foil, resin film, aluminum foil-resin film composite sheet or resin-impregnated paper, and a cap or lid attaced to each end of the tube.

The present invention will be described below in greater detail with reference to examples and comparative examples. In the following description, all the parts and percentages are by weight unless otherwise specified.

In the examples and comparative examples that follow, acrylic resins (1), (2) and (3) are those described below.

Acrylic resin (1)

To an acrylic monomer mixture of 68 parts of methyl methacrylate, 30 parts of ethyl acrylate and 2 parts of methacrylic acid was added 1 part of azobisisobutyronitrile. The mixture is added dropwise to 100 parts of ethylene glycol monoethyl ether maintained at reflux temperature to thereby effect polymerization. Then 0.1 part of azobisisobutyronitrile was further added thereto and this procedure was repeated 5 times to thereby complete the polymerization, giving a resin solution having a solids content of 50% by weight and a viscosity of Z as determined by Gardner-Holdt method.

Acrylic resin (2)

Following the general procedure for preparing Acrylic resin (1) and using a monomer mixture of 38 parts of methyl methacrylate, 50 parts of ethyl acrylate, 10 parts of styrene and 2 parts of methacrylic acid, polymerization was conducted in 60 parts of ethylene glycol monoethyl ether. After the polymerization, 40 parts of ethylene glycol monoethyl ether was additionally added thereto, giving a resin solution having a solids content of 50% by weight and a viscosity of Y as determined by Gardner-Holdt method.

Acrylic resin (3)

Following the general procedure for preparing Acrylic resin (1) and using a monomer mixture of 25 parts of methyl methacrylate, 10 parts of ethyl acrylate, 20 parts of n-butyl acrylate, 20 parts of n-butyl methacrylate, 23 parts of styrene and 2 parts of acrylic acid, polymerization was conducted, giving a resin solution having a solids content of 50% by weight and a viscosity of Z as determined by Gardner-Holdt method.

In the following examples and comparative examples, acrylic resin (1), (2) or (3) was used in the form of a resin solution as described above.

The solid coating compositions prepared in each of the following examples and comparative examples were tested for film properties as follows.

(1) Drying of topcoat

Solid coating composition was applied to a surface of a steel panel (JIS test panel) and dried. Thereafter, an air drying alkyd enamel ("ASAHIPEN one-coat alkyd enamel for steel, white", product of ASAHIPEN CORPORATION, JAPAN) was applied as topcoat, and the panel was left to stand at room temperature for 8 hours, and observed for the drying of the topcoat. The drying degree of the topcoat was evaluated in accordance with the following criteria.
  A: No trace is left when the topcoat is lightly rubbed with a finger.
  B: A trace is left when the topcoat is lightly rubbed with a finger.

(2) Adhesion after water resistance test

Solid coating composition was applied to a steel panel and dried for 7 days. The coated panel was immersed in water for 166 hours at 20° C., then withdrawn and allowed to stand for 2 hours. Then, the coating film was cut crosswise to form 100 squares, 2 mm×2 mm in accordance with JIS K5400-6.15. An adhesive cellophane tape was adhered to the coating surface and then peeled off in perpendicular direction. The number (N) of remaining squres was counted and expressed as N/100.

(3) Gloss retention after accelerated weathering test

Coating of the solid coating composition was treated in a sunshine weatherometer for 200 hours and subsequently residual gloss of the treated coating was measured in accordance with JIS K5400-6.17.

(4) Corrosion after salt spray test

Solid coating composition was applied to a surface of a steel panel and dried for 7 days. The coated panel was tested for resistance to salt spray according to JIS K5400-7.8. A cross cut reaching the substrate was formed in the coating film on the panel, which was then exposed to a salt spray. Then the coated panel was checked for the formation of blister and rust, and evaluated according to the following criteria:
  A: No blister or rust is obserbed in regions other than the cross cut regions.
  B: Slight degree of blister and rust are obserbed in regions other than the cross cut regions.
  C: Substantial degree of blister and rust are obserbed in regions other than the cross cut portions.
The width of rusted portion at the cross cut region was also measured.

EXAMPLE 1

In 80 parts of ethylene glycol monobutyl ether was dissolved 20 parts of polyvinyl butyral (trademark "Denka Butyral #2000L," product of Denki Kagaku Kogyo Kabushiki Kaisha, Japan, polymerization degree 300, up to 3% vinyl acetate, 20–24% vinyl alcohol and at least 73% vinyl butyral).

To 38 parts portion of this resin solution was added 15 parts of titanium oxide (trademark "Titanium oxide JR-500," product of Teikoku Kakou Kabushiki Kaisha, Japan) and the pigment was fully dispersed with use of a roll mill. Then 15 parts of ethylene glycol monobutyl ether and 4 parts of dibutyl phthalate were added thereto with stirring. To the mixture, which was heated at 130° C., was added 6 parts of benzylidene sorbitol and the mixture was stirred until the benzylidene sorbitol was completely dissolved therein.

Then 7 parts of ketone resin (trademark "Hilac 111," product of Hitachi Kasei Kabushiki Kaisha, Japan, softening point 100°-120° C., acid value>1) and 15 parts (calculated as solids) of Acrylic resin (1) were slowly added to the mixture and completely dissolved therein while maintaining the temperature of the mixture at 130° C. It is believed that at this stage, the solvent, i.e., ethylene glycol monoethyl ether contained in Acrylic resin (1) was substantially completely evaporated off.

The resulting coating composition in a liquid state was placed into a container, cooled for solidification and withdrawn therefrom.

In the following examples, solid coating compositions were prepared following the general procedure of above Example 1. In the following examples, only the components used and their proportions are described. The amount of Acrylic resin (1), (2) or (3) used is indicated in terms of the amount caluculated as solids. In each of the following examples and comparative examples in which Acrylic resin (1), (2) or (3) was used, the solvent contained in Acrylic resin (1), (2) or (3) was substantially completely evaporated off during the preparation of the solid coating compositions, as in Example 1.

EXAMPLE 2

| | |
|---|---|
| A solution of 20 parts of polyvinyl butyral (trademark "Denka Butyral #2000L") in 80 parts of ethylene glycol monobutyl ether | 37 parts |
| Carbon black (trademark "Mitsubishi Carbon Black 45B," product of Mitsubishi Kasei Kabushiki Kaisha, Japan) | 7 parts |
| Ethylene glycol monobutyl ether | 18 parts |
| Dibutyl phthalate | 4 parts |
| Dibenzylidene sorbitol | 7 parts |
| Xylene resin (trademark "Nikanol HP-120," product of Mitsubishi Gas Kagaku Kogyo Kabushiki Kaisha, Japan, alkylphenol-modified condensate of m-xylene and formalin, molecular weight 1,300) | 10 parts |
| Acrylic resin (1) | 17 parts |

EXAMPLE 3

| | |
|---|---|
| Cellulose acetate butyrate (trademark "CAB 381-½" product of Eastman Chemical Products, Inc., U.S.A., containing 13% of acetyl and 37% of butyryl) | 7.2 parts |
| Titanium oxide (trademark "Titanium oxide JR-500") | 15 parts |
| Ethylene glycol monoethyl ether acetate | 42.3 parts |
| Dibutyl phthalate | 8 parts |
| Tribenzylidene sorbitol | 5.5 parts |
| Ketone resin (trademark "Hilac 111") | 7 parts |
| Acrylic resin (1) | 15 parts |

EXAMPLE 4

| | |
|---|---|
| A solution of 15 parts of cellulose acetate butyrate (trademark "CAB 381-1/2"") in 85 parts of ethylene glycol monoethyl ether acetate | 49 parts |
| Carbon black (trademark Mitsubishi Carbon Black 45B") | 7 parts |
| Ethylene glycol monoethyl ether acetate | 2.5 parts |
| Dibutyl phthalate | 8 parts |
| Dibenzylidene sorbitol | 6.5 parts |
| Xylene resin (trademark "Nikanol HP-120") | 10 parts |
| Acrylic resin (1) | 17 parts |

COMPARATIVE EXAMPLE 1

A comparative solid coating composition was prepared in the same manner as in Example 1 except that Acrylic resin (2) was used in place of Acrylic resin (1).

COMPARATIVE EXAMPLE 2

A comparative solid coating composition was prepared in the same manner as in Example 2 except that Acrylic resin (2) was used in place of Acrylic resin (1).

COMPARATIVE EXAMPLE 3

A comparative solid coating composition was prepared in the same manner as in Example 3 except that Acrylic resin (2) was used in place of Acrylic resin (1).

COMPARATIVE EXAMPLE 4

A comparative solid coating composition was prepared in the same manner as in Example 4 except that Acrylic resin (2) was used in place of Acrylic resin (1).

COMPARATIVE EXAMPLE 5

A comparative solid coating composition was prepared in the same manner as in Example 1 except that Acrylic resin (3) was used in place of Acrylic resin (1).

COMPARATIVE EXAMPLE 6

A comparative solid coating composition was prepared in the same manner as in Example 2 except that Acrylic resin (3) was used in place of Acrylic resin (1).

COMPARATIVE EXAMPLE 7

A comparative solid coating composition was prepared in the same manner as in Example 3 except that Acrylic resin (3) was used in place of Acrylic resin (1).

COMPARATIVE EXAMPLE 8

A comparative solid coating composition was prepared in the same manner as in Example 4 except that Acrylic resin (3) was used in place of Acrylic resin (1).

COMPARATIVE EXAMPLE 9

In 46 parts of ethylene glycol monobutyl ether was dissolved 20 parts of polyvinyl butyral (trademark "Denka Butyral #2000L").

To 52.8 parts portion of this resin solution were added 15 parts of titanium oxide (trademark "Titanium oxide JR-500"), and the pigment was fully dispersed with use of a roll mill. Then 6.2 parts of ethylene glycol monobutyl ether and 4 parts of dibutyl phthalate were added thereto. The mixture was heated to 130° C., and 6 parts of dibenzylidene sorbitol was added thereto with stirring until the latter was completely dissolved.

Subsequently, 16 parts of ketone resin (trademark "Hilac 111") was added thereto and dissolved therein completely. The resulting liquid composition was solidified by cooling.

COMPARATIVE EXAMPLE 10

A comparative solid coating composition was prepared following the general procedure of Comparative Example 9 and using the following components:

| | |
|---|---|
| A solution of 20 parts of polyvinyl butyral (trademark "Denka Butyral #2000L") in 46 parts of ethylene glycol monobutyl ether | 62.7 parts |
| Carbon black (trademark "Mitsubishi Carbon Black 45B") | 6 parts |
| Ethylene glycol monobutyl ether | 5.3 parts |
| Dibutyl phthalate | 4 parts |
| Dibenzylidene sorbitol | 7 parts |
| Xylene resin (trademark "Nikanol HP-120") | 15 parts |

COMPARATIVE EXAMPLE 11

A comparative solid coating composition was prepared following the general procedure of Comparative Example 9 and using the following components:

| | |
|---|---|
| Cellulose acetate butyrate (trademark "CAB 381-½"") | 16 parts |
| Titanium oxide (trademark "Titanium oxide JR-500") | 15 parts |
| Ethylene glycol monoethyl ether acetate | 40.5 parts |
| Dibutyl phthalate | 8 parts |
| Dibenzylidene sorbitol | 5.5 parts |
| Ketone resin (trademark "Hilac 111") | 15 parts |

COMPARATIVE EXAMPLE 12

A comparative solid coating composition was prepared following the general procedure of Comparative Example 9 and using the following components:

| | |
|---|---|
| Cellulose acetate butyrate (trademark "CAB 381-½"") | 19 parts |
| Carbon black (trademark "Mitsubishi carbon black 45B") | 6 parts |
| Ethylene glycol monoethyl ether acetate | 49 parts |
| Dibutyl phthalate | 4 parts |
| Dibenzylidene sorbitol | 7 parts |
| Xylene resin (trademark "Nikanol HP-120") | 15 parts |

The solid coating compositions prepared above were tested for their film properties. Table 1 below shows the results.

TABLE 1

| | No. | Drying of Topcoat | Adhesion after Water Resistance Test | Gloss Retention after Accelerated Weathering Test (%) |
|---|---|---|---|---|
| EXAMPLE | 1 | A | 100/100 | 81 |
| | 2 | A | 100/100 | 85 |
| | 3 | A | 100/100 | 83 |
| | 4 | A | 100/100 | 86 |
| COMPARATIVE EXAMPLE | 1 | B | 64/100 | 63 |
| | 2 | B | 60/100 | 65 |
| | 3 | B | 58/100 | 61 |
| | 4 | B | 57/100 | 60 |
| | 5 | B | 36/100 | 45 |
| | 6 | B | 40/100 | 48 |
| | 7 | B | 37/100 | 49 |
| | 8 | B | 34/100 | 43 |
| | 9 | B | 0/100 | 27 |
| | 10 | B | 0/100 | 31 |
| | 11 | B | 0/100 | 28 |
| | 12 | B | 0/100 | 21 |

EXAMPLE 11

In 80 parts of ethylene glycol monobutyl ether was dissolved 20 parts of polyvinyl butyral (trademark "Denka Butyral #2000L").

To 38 parts portion of this resin solution was added 15 parts of zinc powder (trademark "Zinc Powder," product of Honjou Aen Kabushiki Kaisha, Japan) and the pigment was fully dispersed with use of a roll mill. Then 15 parts of ethylene glycol monobutyl ether and 4 parts of dibutyl phthalate were added thereto. To the mixture, which was heated at 130° C., was added 6 parts of benzylidene sorbitol and the mixture was stirred until the benzylidene sorbitol was completely dissolved therein.

Then 7 parts of ketone resin (trademark "Hilac 111") and 15 parts (calculated as solids) of Acrylic resin (1) were slowly added to the mixture and completely dissolved therein while maintaining the temperature of the mixture at 130° C.

It is believed that at this stage the solvent, i.e., ethylene glycol monoethyl ether contained in Acrylic resin (1) was substsantially completely evaporated off.

The resulting coating composition in a liquid state was placed into a container, cooled for solidification and withdrawn therefrom.

In the following examples, solid anticorrosive coating compositions were prepared following the general procedure of above Example 11. In the following examples, only the components used and their proportions are described. The amount of Acrylic resin (1), (2) or (3) used is indicated in terms of the amount caluculated as solids. In each of the following examples and comparative examples in which Acrylic resin (1), (2) or (3) was used, the solvent contained in Acrylic resin (1), (2) or (3) was substantially completely evaporated off during the preparation of the solid coating compositions, as in Example 11.

EXAMPLE 12

| | |
|---|---|
| A solution of 20 parts of polyvinyl butyral (trademark "Denka Butyral #2000L") in 80 parts of ethylene glycol monobutyl ether | 38 parts |
| Titanium oxide (trademark "Titanium oxide JR-500") | 10 parts |
| Zinc molybdate (trademark "Molywhite P3S," product of Nihon Muki Kagaku Kogyo Kabushiki Kaisha, Japan) | 5 parts |
| Ethylene glycol monobutyl ether | 15 parts |
| Dibutyl phthalate | 4 parts |
| Dibenzylidene sorbitol | 6 parts |
| Xylene resin (trademark "Nikanol HP-120") | 7 parts |
| Acrylic resin (1) | 15 parts |

EXAMPLE 13

| | |
|---|---|
| Cellulose acetate butyrate (trademark "CAB 381-½″") | 7.2 parts |
| Zinc chromate (trademark "Zinc chromate ZPC," product of Nihon Muk Kagaku Kogyo Kabushiki Kaisha, Japan) | 10 parts |
| Ethylene glycol monoethyl ether acetate | 42.3 parts |
| Dibutyl phthalate | 8 parts |
| Tribenzylidene sorbitol | 5.5 parts |
| Ketone resin (trademark "Hilac 111") | 9 parts |
| Acrylic resin (1) | 18 parts |

EXAMPLE 14

| | |
|---|---|
| A solution of 15 parts of cellulose acetate butyrate (trademark "CAB 381-½″") in 85 parts of ethylene glycol monoethyl ether acetate | 49 parts |
| Carbon black (trademark "Mitsubishi Carbon Black 45B") | 3.5 parts |
| Calcium plumbate (trademark "Calcium Plumbate," product of Sakai Kagaku Kogyo Kabushiki Kaisha, Japan) | 3.5 parts |
| Ethylene glycol monoethyl ether acetate | 2.5 parts |
| Dibutyl phthalate | 8 parts |
| Dibenzylidene sorbitol | 6.5 parts |
| Xylene resin (trademark "Nikanol HP-120") | 10 parts |
| Acrylic resin (1) | 17 parts |

COMPARATIVE EXAMPLE 21

A comparative solid coating composition was prepared in the same manner as in Example 11 except that Acrylic resin (2) was used in place of Acrylic resin (1).

COMPARATIVE EXAMPLE 22

A comparative solid coating composition was prepared in the same manner as in Example 12 except that Acrylic resin (2) was used in place of Acrylic resin (1).

COMPARATIVE EXAMPLE 23

A comparative solid coating composition was prepared in the same manner as in Example 13 except that Acrylic resin (2) was used in place of Acrylic resin (1).

COMPARATIVE EXAMPLE 24

A comparative solid coating composition was prepared in the same manner as in Example 14 except that Acrylic resin (2) was used in place of Acrylic resin (1).

COMPARATIVE EXAMPLE 25

A comparative solid coating composition was prepared in the same manner as in Example 11 except that Acrylic resin (3) was used in place of Acrylic resin (1).

COMPARATIVE EXAMPLE 26

A comparative solid coating composition was prepared in the same manner as in Example 12 except that Acrylic resin (3) was used in place of Acrylic resin (1).

COMPARATIVE EXAMPLE 27

A comparative solid coating composition was prepared in the same manner as in Example 13 except that Acrylic resin (3) was used in place of Acrylic resin (1).

COMPARATIVE EXAMPLE 28

A comparative solid coating composition was prepared in the same manner as in Example 14 except that Acrylic resin (3) was used in place of Acrylic resin (1).

COMPARATIVE EXAMPLE 29

In 46 parts of ethylene glycol monobutyl ether was dissolved 20 parts of polyvinyl butyral (trademark "Denka Butyral #2000L").

To 52.8 parts portion of this resin solution were added 15 parts of zinc powder (trademark "Zinc Powder F-100R," product of Honjou Aen Kabushiki Kaisha), and the pigment was fully dispersed with use of a roll mill. Then 6.2 parts of ethylene glycol monobutyl ether and 4 parts of dibutyl phthalate were added thereto. The mixture was heated to 130° C., and 6 parts of dibenzylidene sorbitol was added thereto with stirring until the latter was completely dissolved.

Subsequently, 16 parts of ketone resin (trademark "Hilac 111") was added thereto and dissolved therein completely. The resulting liquid composition was solidified by cooling.

COMPARATIVE EXAMPLE 30

A comparative solid coating composition was prepared following the general procedure of Comparative Example 29 and using the following components:

| | |
|---|---|
| A solution of 20 parts of polyvinyl butyral (trademark "Denka Butyral #2000L") in 46 parts of ethylene glycol monobutyl ether | 54.7 parts |
| Titanium oxide (trademark "Titanium oxide JR-500") | 10 parts |
| Zinc molybdate (trademark "Molywhite P3S") | 5 parts |
| Ethylene glycol monobutyl ether | 5.3 parts |
| Dibutyl phthalate | 4 parts |
| Dibenzylidene sorbitol | 6 parts |
| Xylene resin (trademark "Nikanol HP120") | 15 parts |

COMPARATIVE EXAMPLE 31

A comparative solid coating composition was prepared following the general procedure of Comparative Example 29 and using the following components:

| | |
|---|---|
| Cellulose acetate butyrate (trademark "CAB 381-½″") | 16 parts |
| Zinc chromate (trademark "Zinc chromate ZPC") | 15 parts |
| Ethylene glycol monoethyl ether acetate | 40.5 parts |
| Dibutyl phthalate | 8 parts |

-continued

| | |
|---|---|
| Dibenzylidene sorbitol | 5.5 parts |
| Ketone resin (trademark "Hilac 111") | 15 parts |

COMPARATIVE EXAMPLE 32

A comparative solid coating composition was prepared following the general procedure of Comparative Example 29 and using the following components:

| | |
|---|---|
| Cellulose acetate butyrate (trademark "CAB 381-½‴") | 19 parts |
| Carbon black (trademark "Mitsubishi carbon black 45B") | 3.5 parts |
| Calcium plumbate (trademark "Calcium Plumbate," product of Sakai Kagaku Kogyo, Japan) | 3.5 parts |
| Ethylene glycol monoethyl ether acetate | 48 parts |
| Dibutyl phthalate | 4 parts |
| Dibenzylidene sorbitol | 7 parts |
| Xylene resin (trademark "Nikanol HP-120") | 15 parts |

The solid anticorrosive coating compositions prepared above were tested for their film properties. Table 2 below shows the results. In Table 2, the values in parentheses in Corrosion Resistance to Salt Spray show the with of the rusted portion at the cross cut region.

TABLE 2

| | No. | Drying Degree of Topcoat | Adhesion after Water Resistance Test | Corrosion Resistance Spray (Width of rust) | Gloss Retention after Accelerated Waethering Test (%) |
|---|---|---|---|---|---|
| EXAMPLE | 11 | A | 100/100 | A (4 mm) | 80 |
| | 12 | A | 100/100 | A (3 mm) | 80 |
| | 13 | A | 100/100 | A (4 mm) | 83 |
| | 14 | A | 100/100 | A (4 mm) | 81 |
| COMPARATIVE | 21 | B | 64/100 | B slight degree of blister(6 mm) | 51 |
| EXAMPLE | 22 | B | 60/100 | B (7 mm) | 50 |
| | 23 | B | 58/100 | B (7 mm) | 52 |
| | 24 | B | 57/100 | B (6 mm) | 55 |
| | 25 | B | 36/100 | B (7 mm) | 42 |
| | 26 | B | 40/100 | B (7 mm) | 44 |
| | 27 | B | 37/100 | B (6 mm) | 46 |
| | 28 | B | 34/100 | B (6 mm) | 41 |
| | 29 | B | 0/100 | C blister over the entire surface (10 mm) | 17 |
| | 30 | B | 0/100 | C (10 mm) | 21 |
| | 31 | B | 0/100 | C (10 mm) | 18 |
| | 32 | B | 0/100 | C (9 mm) | 15 |

We claim:

1. A solid coating composition comprising:
   (A) at least one of a vinyl resin and cellulose resin wherein the vinyl resin is selected from the group consisting of polyvinyl butyral, polyvinyl acetate, vinyl acetate-vinyl chloride copolymer and vinyl acetate-ethylene copolymer and wherein the cellulose resin is selected from the group consisting of cellulose acetate butyrate, ethyl cellulose and acetyl cellulose;
   (B) at least one of a ketone resin and a xylene resin;
   (C) an acrylic resin comprising about 40 to about 90% by weight of methyl methacrylate, about 10 to about 60% by weight of at least one member selected from the group consisting of acrylic acid, an acrylic acid derivative, methacrylic acid and a methacrylic acid derivative other than methyl methacrylate, and up to about 10% by weight of a copolymerizable monomer;
   (D) at least one member selected from the group consisting of benzylidene sorbitol, dibenzylidene sorbitol, tribenzylidene sorbitol and a derivative thereof;
   (E) at least one member selected from the group consisting of an ether of a glycol, ether ester of a glycol and a benzoic acid ester; and
   (F) a pigment.

2. A solid coating composition as defined in claim 1 which further comprises a plasticizer as component (G).

3. A solid coating composition as defined in claim 1 wherein component (A) is polyvinyl butyral or cellulose acetate butyrate.

4. A solid coating composition as defined in claim 1 wherein component (A) is used in an amount of about 3 to about 15 parts by weight per 100 parts by weight of the composition.

5. A solid coating composition as defined in claim 1 wherein component (A) is used in an amount of about 5 to about 10 parts by weight per 100 parts by weight of the composition.

6. A solid coating composition as defined in claim 1 wherein component (B) is used in an amount of about 5 to about 15 parts by weight per 100 parts by weight of the composition.

7. A solid coating composition as defined in claim 1 wherein component (B) is used in an amount of about 7 to about 12 parts by weight per 100 parts by weight of the composition.

8. A solid coating composition as defined in claim 1 wherein component (C) is an acrylic resin comprising, as its constituent monomers, about 40 to about 90% by weight of methyl methacrylate, about 10 to about 60% by weight of at least one member selected from the group of acrylic acid, $C_1$–$C_8$ alkyl acrylate, 2-hydroxyethyl acrylate, methacrylic acid, $C_2$–$C_4$ alkyl methacrylate and 2-hydroxyethyl methacrylate, and up to about 10% by weight of at least one copolymerizable monomer selected from the group consisting of styrene, itaconic acid and dimethyl fumarate.

9. solid coating composition as defined in claim 1 wherein component (C) is used in an amount of about 10 to about 25 parts by weight per 100 parts by weight of the composition.

10. A solid coating composition as defined in claim 1 wherein component (C) is used in an amount of about 14 to about 20 parts by weight per 100 parts by weight of the composition.

11. A solid coating composition as defined in claim 1 wherein component (D) is at least one condensation products of one of xylitol, sorbitol and heptitol and an aromatic aldehyde of the formula

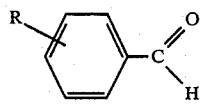

wherein R is a hydrogen atom, an alkyl group having 1-3 carbon atoms, or methoxy group.

12. A solid coating composition as defined in claim 1 wherein component (D) is used in an amount of about 3 to about 12 parts by weight per 100 parts by weight of the composition.

13. A solid coating composition as defined in claim 1 wherein component (D) is used in an amount of about 5 to about 9 parts by weight per 100 parts by weight of the composition.

14. A solid coating composition as defined in claim 1 wherein component (E) is used in an amount of about 30 to about 60 parts by weight per 100 parts by weight of the composition.

15. A solid coating composition as defined in claim 1 wherein component (E) is used in an amount of about 38 to about 52 parts by weight per 100 parts by weight of the composition.

16. A solid coating composition as defined in claim 1 wherein component (F) is used in an amount of about 0.3 to about 35 parts by weight per 100 parts by weight of the composition.

17. A solid coating composition as defined in claim 1 wherein component (F) is a coloring pigment and is used in an amount of about 2 to about 35 parts by weight per 100 parts by weight of the composition.

18. A solid coating composition as defined in claim 1 wherein component (F) is a coloring pigment and is used in an amount of about 4 to about 30 parts by weight per 100 parts by weight of the composition.

19. A solid coating composition as defined in claim 1 wherein component (F) is an anticorrosive pigment and is used in an amount of about 0.3 to about 35 parts by weight per 100 parts by weight of the composition.

20. A solid coating composition as defined in claim 1 wherein component (F) is an anticorrosive pigment and is used in an amount of about 1 to about 30 parts by weight per 100 parts by weight of the composition.

21. A solid coating composition as defined in claim 1 wherein component (F) comprises a coloring pigment and anticorrosive pigment wherein, per 100 parts by weight of the composition, the coloring pigment is used in an amount of more than about 2 parts by weight and the anticorrosive pigment is used in an amount of more than about 0.3 parts by weight, and the total amount of these pigments are up to about 35 parts by weight.

22. A solid coating composition as defined in claim 2 wherein component (G) is at least one member selected from the group consisting of a phthalic acid ester, epoxy plasticizer, 2-ethylhexyl sebacate and tricresyl phosphate.

23. A solid coating composition as defined in claim 2 wherein component (G) is used in an amount of about 2 to about 8 parts by weight per 100 parts by weight of the composition.

* * * * *

UNITED STATES PATENT AND TRADEMARK OFFICE
CERTIFICATE OF CORRECTION

PATENT NO.   :   4,829,108
DATED        :   May 9, 1989
INVENTOR(S)  :   OKUDA et al

It is certified that error appears in the above—identified patent and that said Letters Patent is hereby corrected as shown below:

On the title page:

Item 73 should read as follows:

[73]  ASSIGNEE:   Sakura Color Products Corporation,
                  Osaka, Japan
                  and
                  Asahipen Corporation,
                  Osaka, Japan Signed and Sealed this Twenty-sixth Day of October, 1993

Attest:

BRUCE LEHMAN

*Attesting Officer*    *Commissioner of Patents and Trademarks*